(12) United States Patent
Alvarez et al.

(10) Patent No.: US 7,292,041 B2
(45) Date of Patent: Nov. 6, 2007

(54) Q-DAMPING CIRCUIT INCLUDING A DIODE ACTING AS A RESISTOR FOR DAMPING A HIGH TEMPERATURE SUPERCONDUCTOR SELF-RESONANT COIL IN A NUCLEAR QUADRUPOLE RESONANCE DETECTION SYSTEM

(75) Inventors: Robby L. Alvarez, Newark, DE (US); Daniel B. Laubacher, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/996,396

(22) Filed: Nov. 23, 2004

(65) Prior Publication Data

US 2005/0140371 A1    Jun. 30, 2005

Related U.S. Application Data

(60) Provisional application No. 60/524,472, filed on Nov. 24, 2003.

(51) Int. Cl.
    *G01V 3/00* (2006.01)
(52) U.S. Cl. ...................................... 324/322
(58) Field of Classification Search ........ 324/300–322; 333/1–212, 219–235
    See application file for complete search history.

(56) References Cited

U.S. PATENT DOCUMENTS

| | | |
|---|---|---|
| 3,373,348 A | 3/1968 | Vanier et al. |
| 3,764,892 A | 10/1973 | Rollwitz |
| 4,027,768 A | 6/1977 | Riessen |
| 4,514,691 A | 4/1985 | De Los Santos et al. |
| 5,036,279 A * | 7/1991 | Jonsen ..................... 324/307 |
| 5,135,908 A | 8/1992 | Yang et al. |
| 5,206,592 A * | 4/1993 | Buess et al. ................ 324/307 |
| 5,233,300 A | 8/1993 | Buess et al. |
| 5,258,710 A | 11/1993 | Black et al. |
| 5,262,394 A | 11/1993 | Wu et al. |
| 5,276,398 A | 1/1994 | Withers et al. |
| 5,351,007 A | 9/1994 | Withers et al. |
| 5,418,213 A | 5/1995 | Tanaka et al. |
| 5,457,385 A | 10/1995 | Sydney et al. |
| 5,583,437 A | 12/1996 | Smith et al. |

(Continued)

FOREIGN PATENT DOCUMENTS

EP    0 426 851    5/1991

(Continued)

OTHER PUBLICATIONS

Garroway, et al., "Remote Sensing By Nuclear Quadrupole Resonance", IEEE Transactions on Geoscience and Remote Sensing, Jun. 2001, pp. 1108-1118, vol. 39, No. 6.

(Continued)

*Primary Examiner*—Diego Gutierrez
*Assistant Examiner*—Dixomara Vargas

(57) ABSTRACT

The use of a bias controlled diode in the Q-damping circuit of a high temperature superconductor transmit, receive, or transmit and receive self-resonant coil in a nuclear quadrupole resonance detection system results in improved performance. The diode is operated with a forward bias such that the diode is resistive with a resistance of about 10 to about 1000 ohms.

28 Claims, 3 Drawing Sheets

U.S. PATENT DOCUMENTS

| | | | |
|---|---|---|---|
| 5,585,723 A * | 12/1996 | Withers | 324/318 |
| 5,592,083 A | 1/1997 | Magnuson et al. | |
| 5,594,338 A | 1/1997 | Magnuson | |
| 5,656,937 A | 8/1997 | Cantor | |
| 5,661,400 A | 8/1997 | Plies et al. | |
| 5,750,473 A | 5/1998 | Shen | |
| 5,751,146 A | 5/1998 | Hrovat | |
| 5,804,967 A | 9/1998 | Miller et al. | |
| 5,814,987 A | 9/1998 | Smith et al. | |
| 5,814,989 A | 9/1998 | Smith et al. | |
| 5,814,992 A | 9/1998 | Busse-Gracitz et al. | |
| 5,872,080 A | 2/1999 | Arendt et al. | |
| 5,952,269 A | 9/1999 | Ma et al. | |
| 5,973,495 A | 10/1999 | Mansfield | |
| 5,986,455 A | 11/1999 | Magnuson | |
| 5,999,000 A | 12/1999 | Srinivasan | |
| 6,025,719 A | 2/2000 | Anderson | |
| 6,054,856 A | 4/2000 | Garroway et al. | |
| 6,088,423 A | 7/2000 | Krug et al. | |
| 6,091,240 A | 7/2000 | Smith et al. | |
| 6,104,190 A | 8/2000 | Buess et al. | |
| 6,108,569 A | 8/2000 | Shen | |
| 6,150,816 A | 11/2000 | Srinivasan | |
| 6,166,541 A | 12/2000 | Smith et al. | |
| 6,169,399 B1 | 1/2001 | Zhang et al. | |
| 6,194,898 B1 | 2/2001 | Magnuson et al. | |
| 6,201,392 B1 | 3/2001 | Anderson et al. | |
| 6,218,943 B1 | 4/2001 | Ellenbogen | |
| 6,242,918 B1 | 6/2001 | Miller et al. | |
| 6,291,994 B1 * | 9/2001 | Kim et al. | 324/300 |
| 6,335,622 B1 | 1/2002 | James et al. | |
| 6,370,404 B1 | 4/2002 | Shen | |
| D459,245 S | 6/2002 | Power | |
| 6,420,872 B1 | 7/2002 | Garroway et al. | |
| 6,486,838 B1 | 11/2002 | Smith et al. | |
| 6,538,445 B2 | 3/2003 | James et al. | |
| 6,541,966 B1 | 4/2003 | Keene | |
| 6,556,013 B2 * | 4/2003 | Withers | 324/322 |
| 6,566,873 B1 | 5/2003 | Smith et al. | |
| 6,590,394 B2 | 7/2003 | Wang et al. | |
| 6,617,591 B1 | 9/2003 | Simonson et al. | |
| 6,653,917 B2 | 11/2003 | Kang et al. | |
| 6,751,489 B2 | 6/2004 | Shen | |
| 6,751,847 B1 | 6/2004 | Brey et al. | |
| 6,777,937 B1 | 8/2004 | Miller et al. | |
| 6,819,109 B2 | 11/2004 | Sowers et al. | |
| 6,847,208 B1 | 1/2005 | Crowley et al. | |
| 6,952,163 B2 | 10/2005 | Muey et al. | |
| 6,956,476 B2 | 10/2005 | Buess et al. | |
| 6,958,608 B2 | 10/2005 | Takagi et al. | |
| 7,049,814 B2 | 5/2006 | Mann | |
| 7,106,058 B2 | 9/2006 | Wilker et al. | |
| 2002/0068682 A1 | 6/2002 | Shen | |
| 2002/0153891 A1 | 10/2002 | Smith et al. | |
| 2002/0156362 A1 | 10/2002 | Bock et al. | |
| 2002/0169374 A1 | 11/2002 | Jevtic | |
| 2002/0190715 A1 | 12/2002 | Marek | |
| 2003/0020553 A1 | 1/2003 | Gao et al. | |
| 2003/0062896 A1 | 4/2003 | Wong et al. | |
| 2003/0071619 A1 | 4/2003 | Sauer et al. | |
| 2003/0119677 A1 | 6/2003 | Qiyan et al. | |
| 2003/0136920 A1 | 7/2003 | Flores et al. | |
| 2004/0124840 A1 | 7/2004 | Reykowski | |
| 2004/0222790 A1 | 11/2004 | Karmi et al. | |
| 2004/0251902 A1 | 12/2004 | Takagi et al. | |
| 2005/0104593 A1 | 5/2005 | Laubacher et al. | |
| 2005/0122109 A1 * | 6/2005 | Wilker et al. | 324/318 |
| 2005/0140371 A1 * | 6/2005 | Alvarez | 324/322 |
| 2005/0146331 A1 | 7/2005 | Flexman et al. | |
| 2005/0206382 A1 | 9/2005 | Laubacher et al. | |
| 2005/0248345 A1 | 11/2005 | Alvarez | |
| 2005/0258831 A1 | 11/2005 | Alvarez | |
| 2005/0264289 A1 | 12/2005 | Alvarez | |
| 2005/0270028 A1 | 12/2005 | Alvarez | |
| 2006/0012371 A1 * | 1/2006 | Laubacher et al. | 324/322 |
| 2006/0038563 A1 | 2/2006 | Cisholm et al. | |
| 2006/0082368 A1 | 4/2006 | McCambridge | |
| 2006/0119360 A1 | 6/2006 | Yamamoto et al. | |

FOREIGN PATENT DOCUMENTS

| | | |
|---|---|---|
| EP | 1 122 550 A1 | 8/2001 |
| EP | 1 168 483 | 1/2002 |
| EP | 1 416 291 | 5/2004 |
| EP | 1 477 823 A | 11/2004 |
| GB | 2 286 248 | 8/1995 |
| GB | 2 289 344 | 11/1995 |
| JP | 05 269108 | 10/1993 |
| JP | 07 265278 | 10/1995 |
| WO | WO 92/17793 | 10/1992 |
| WO | WO 92/17794 | 10/1992 |
| WO | WO 92/19978 | 11/1992 |
| WO | WO 92/21989 | 12/1992 |
| WO | WO 94/05022 | 3/1994 |
| WO | WO 95/34096 | 12/1995 |
| WO | WO 96/39636 | 12/1996 |
| WO | WO 96/39638 | 12/1996 |
| WO | WO 98/37438 | 8/1998 |
| WO | WO 98/54590 | 12/1998 |
| WO | WO 99/45409 | 9/1999 |
| WO | WO 99/50689 | 10/1999 |
| WO | WO 00/70356 | 11/2000 |
| WO | WO 02/082115 A2 | 10/2002 |
| WO | WO 02/098364 | 12/2002 |
| WO | WO 03/014700 | 2/2003 |
| WO | WO 03/040761 | 5/2003 |
| WO | WO 03/096041 | 11/2003 |
| WO | WO 2004/001454 A | 12/2003 |
| WO | WO 2004/102596 | 11/2004 |
| WO | WO 2005/059582 A1 | 6/2005 |

OTHER PUBLICATIONS

Garroway, et al., "Narcotics and Explosives Detection by 14N pure NQR", SPIE, 1993, pp. 318-327, vol. 2092, Maryland.

Hirschfeld, et al., "Short Range Remote NQR Measurements", Journal of Molecular Structure, 1980, pp. 63-77, vol. 58, The Netherlands.

Miller, et al., "Performance of a High-Termperature Superconducting Probe for In Vivo Microscopy at 2.0 T", Magnetic Resonance in Medicine, (1999) pp. 72-79, vol. 41.

W.H. Wong, et al., "HTS Coils for High Resolution Nuclear Magnetic Resonance Spectroscopy", Advances in Cryogenic Engineering, (1996), pp. 953-959, New York.

V. Kotsubo et al., "Cryogenic System for a High Temperature Superconductor NMR Probe", Advances in Cryogenic Engineering, Jul. 17, 1995, vol. 41, pp. 1857-1864, New York.

Kushida, et al., "Dependence on the Pure Quadrupole Resonance Frequency on Pressure and Temperature", Physical Review, (Dec. 1956), pp. 1364-1377, vol. 104, No. 5, Massachusetts.

Vanier, "Temperature Dependence of the Pure Nuclear Quadrupole Resonance Frequency in KC103", Canadian Journal of Physics, (Nov. 1960), pp. 1397-1405, vol. 38, No. 11, Canada.

Smith, et al., "Nitrogen Electric Quadrupole and Proton Magnetic Resonances in Thiourea", Journal of Chemical Physics, (Oct. 1964), pp. 2403-2416, vol. 41, No. 8, New York.

Turner, C.W., High temperature superconductor circuit components for cryogenic microwave systems, Electrical and Computer Engineering, 1993, Canadian Conference on Vancouver, BC Canada Sep. 14-17, 1993 XP 010118071.

W. A. Edelstein et al., A signal-to-noise calibration procedure for NMR imaging systems, Medical Physics, vol. 11 (2) Mar./Apr. 1984, pp. 180-185.

Charles Wilker, "HTS Sensors for NQR Spectroscopy", vol. 1, pp. 143-146, 2004.

Anders Stensgaard, "Optimized Design of the Shielded-Loop Resonator", Journal of Magnetic Resonance, 122, 120-126 (1996), Article No. 0187.

He, D.F. et al., "Metal detector based on high-To RF SQUID", Physica C 378-381 (2002) pp. 1404-1407.

Bendall, et al., "Elimination of Coupling between Cylindrical Transmit Coils and Surface-Receive Coils for in Vivo NMR" Magnetic Resonance in Medicine v3 p. 157-163, 1986.

Black, et al., "A High-Temperature Superconducting Receiver For Nuclear Magnetic Resonance Microscopy", Science, vol. 259, pp. 793-795 Feb. 5, 1993.

Black, et al., "Performane Of A High-Temperature Superconducting Resonator For High-Field Imaging", Journal Of Magnetic Resonance, pp. 74-80 (1995).

Colton, et. al., "Making the World a Safer Place", Science, v.299, i.5611, pp. 1324-1325, Feb. 2006.

Fisher, et al., "A Versatile Computer-Controlled Pulsed Nuclear Quadrupole Resonance Spectrometer", Review of Scientific Instruments, v70, No. 12, p. 4678, Dec. 1999.

Hill, "Improved Sensitivity of NMR Spectroscopy Probes By Use Of High-Temperature Superconductive Detection Coils", IEEE Transactions On Applied Superconductivity, vol. 7, pp. 3750-3753, Jun. 1997.

Roemer, et. al., "The NMR Phased Array", Magnetic Resonance In Medicine, 16, pp. 192-225, 1990.

Withers, et al., "Thin-Film HTD Probe Coils For Magnetic-Resonance Imaging", IEEE Transactions On Applied Superconductivity, vol. 3, pp. 2450-2453, Mar. 1993.

Landers, et al., "Electronic Effects and Molecular Motion in β-Octahydro-1,3,5,7-tetranitro-1,3,5,7-tetrazocine Bases on $^{14}$N Nuclear Quadrupole Resonance Spectroscopy", American Chemical Society, *J. Phys. Chem.*, 85, pp. 2618-2623, 1981.

Karpowicz, et. Al., "Librational Motion of Hexahydro-1,3,5-trinitro-s-triazine Based on the Temperature Dependence of the Nitrogen-14 Nuclear Quadrupole Resonance Spectra: The Relationship to Condensed-Phase Thermal Decomposition", American Chemical Society, *J. Phys. Chem.* 87, pp. 2109-2112, 1983.

Volpicelli, et. al., "Locked rf Spectrometer for Nuclear Quadrupole Resonance", The Review of Scientific Instruments, v.25, No. 2, pp. 150-153, Feb. 1965.

Benedek, et. al., "Precise Nuclear Resonance Thermometer", The Review of Scientific Instruments, v.28, No. 2, pp. 92-95, Feb. 1957.

Ernst, "Magnetic Resonance with Stochastic Excitation", Journal of Magnetic Resonance 3, pp. 10-27, 1970.

Klainer, et. al., "Fourier Transform Nuclear Quadrupole Resonance Spectroscopy", Fourier, Hadamard, and Hilbert Transforms in Chemistry, pp. 147-182, 1982.

He, D.F. et al., "Metal detector based on high-To RF SQUID", Physica C 378-381 (2002) pp. 1404-1407.

* cited by examiner

US 7,292,041 B2

Q-DAMPING CIRCUIT INCLUDING A DIODE ACTING AS A RESISTOR FOR DAMPING A HIGH TEMPERATURE SUPERCONDUCTOR SELF-RESONANT COIL IN A NUCLEAR QUADRUPOLE RESONANCE DETECTION SYSTEM

This application claims the benefit of U.S. Provisional Application No. 60/524,472, filed on Nov. 24, 2003, which is incorporated in its entirety as a part hereof for all purposes.

FIELD OF THE INVENTION

This invention relates to a nuclear quadrupole resonance detection system, and the use of a bias controlled diode in a Q-damping circuit for a high temperature superconductor transmit, receive, or transmit and receive, self-resonant coil.

BACKGROUND OF THE INVENTION

The use of nuclear quadrupole resonance (NQR) as a means of detecting explosives and other contraband has been recognized for some time—see e.g. T. Hirshfield et al, *J. Molec. Struct.* 58, 63 (1980); A. N. Garroway et al, *Proc. SPIE* 2092, 318 (1993); and A. N Garroway et al, *IEEE Trans. on Geoscience and Remote Sensing*, 39, pp. 1108-1118 (2001). NQR provides some distinct advantages over other detection methods. NQR requires no external magnet such as required by nuclear magnetic resonance. NQR is sensitive to the compounds of interest, i.e. there is a specificity of the NQR frequencies.

One technique for measuring NQR in a sample is to place the sample within a solenoid coil that surrounds the sample. The coil provides a radio frequency (RF) magnetic field that excites the quadrupole nuclei in the sample, and results in their producing their characteristic resonance signals. This is the typical apparatus configuration that might be used for scanning mail, baggage or luggage. There is also need for a NQR detector that permits detection of NQR signals from a source outside the detector, e.g. a wand detector, that could be passed over persons or containers as is done with existing metal detectors. Problems associated with such a detector using conventional systems are the decrease in detectability with distance from the detector coil, and the associated equipment needed to operate the system.

A NQR detection system can have one or more coils that both transmit and receive, or it can have coils that solely transmit or solely receive. The transmit, or transmit and receive, coil of a NQR detection system provides a radio frequency (RF) magnetic field that excites the quadrupole nuclei in the sample, and results in their producing their characteristic resonance signals that the receive, or transmit and receive, coil detects. NQR signals have low intensity and short duration.

The transmit, receive, or transmit and receive, coil is preferably tunable and has a high quality factor (Q). After the RF signal is transmitted, the transmit, receive, or transmit and receive, coil will typically experience ringing, and it must have a rapid recovery time in order for the receive, or transmit and receive, coil to be able to detect the low intensity NQR signal. One method of accomplishing this is to use a Q-damping circuit that is activated to provide a rapid recovery.

A simple Q-damping circuit is shown in FIG. 1. The transmit, receive or transmit and receive, coil 1 is inductively coupled to single loop or coil 2. The Q-damping circuit is comprised of single loop or coil 2, a diode switch 3, a capacitor 4 and a resistor 5. Various other component arrangements can be used between points 6 and 7, such as those shown in Kim, U.S. Pat. No. 6,291,994. The single loop or coil 2 can be a single loop, a solenoid, or a center-taped single loop or solenoid. The diode switch 3 is open when no damping is needed, and closed so that the resistive load can provide the Q-damping when needed.

The transmit, receive, or transmit and receive, coil has typically been made of copper and therefore has a Q of about $10^2$. It is advantageous to use a transmit, receive, or transmit and receive, coil made of a high temperature superconductor (HTS) rather than copper since the HTS self-resonant coil has a Q of the order of $10^3$-$10^6$. AS the recovery time is proportional to Q, the HTS coil has a considerably longer recovery time than a copper coil. An efficient Q-damping circuit is therefore a necessity.

An object of the present invention is to provide an efficient Q-damping circuit for an HTS coil.

SUMMARY OF THE INVENTION

This invention provides a nuclear quadrupole resonance detection system comprising a high temperature superconductor self-resonant transmit, receive, or transmit and receive, coil and a Q-damping circuit for the transmit, receive, or transmit and receive, coil, wherein the Q-damping circuit contains a diode operated with a forward bias such that the diode is resistive with a resistance of about 10 to about 1000 ohms. Preferably, the resistance is from about 100 to about 800 ohms, is more preferably about 500 to about 650 ohms, and is most preferably about 600 ohms.

Preferably, the Q-damping circuit is inductively coupled to the high temperature superconductor self-resonant transmit, receive, or transmit and receive, coil by means of a single loop or coil. Preferably, the coupling single loop or coil is made of copper or a high temperature superconductor.

The Q-damping circuit may be further comprised of a capacitor to shift the resonant frequency of the high temperature superconductor self-resonant transmit, receive, or transmit and receive, coil.

This detection system is especially useful for detecting explosives, drugs and other contraband.

DETAILED DESCRIPTION OF THE PREFERRED EMBODIMENTS

This invention relates to a NQR detection system that has a high temperature superconductor self-resonant transmit, receive, or transmit and receive, coil, and a Q-damping circuit for the transmit, receive, or transmit and receive, coil, wherein the Q-damping circuit contains a diode operated with a forward bias such that the diode is resistive. For some applications, it is advantageous to have separate transmit and receive coils. In these instances, one or both of the coils can be HTS self-resonant coils. For some detection purposes, the NQR detection system will be comprised of a single transmit and receive coil, or a single set of separate transmit and receive coils. For other detection purposes, the NQR detection system will be comprised of two or more transmit and receive coils, or two or more sets of separate transmit and receive coils. In these instances, there will be a Q-damping circuit for at least one of the HTS coils and preferably for all of the HTS coils.

Figure 1:
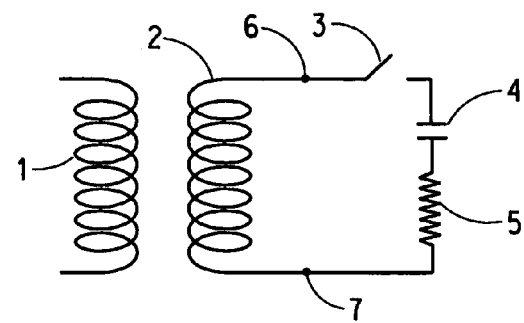
FIG. 1 shows a simple Q-damping circuit of the prior art.

Employing the diode as a resistance in the circuit eliminates the need for the resistor 5 shown in FIG. 1, and provides an efficient Q-damping circuit.

Figure 2:
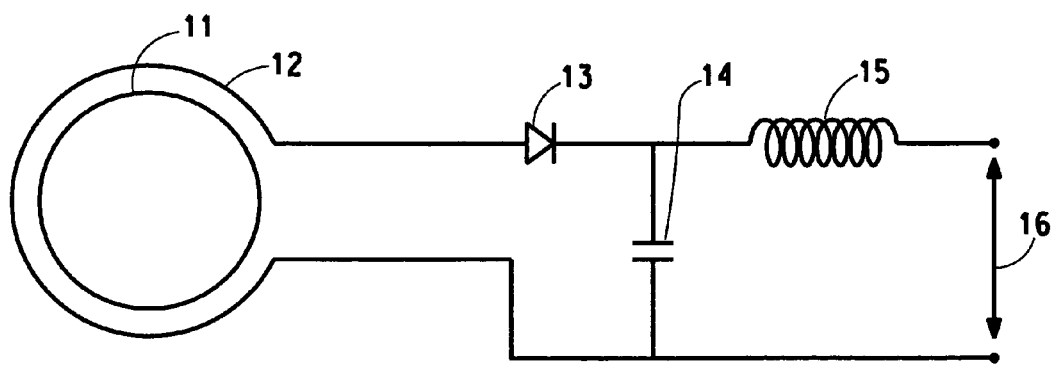
FIG. 2 shows a Q-damping circuit of the instant invention.

An embodiment of the instant invention is shown in FIG. 2. The HTS self-resonant transmit, receive, or transmit and receive, coil 11 is inductively coupled to single loop 12 of the Q-damping circuit. The Q-damping circuit is comprised of single loop 12, a diode 13, a capacitor 14 and an inductor 15. The single loop 12 can be replaced by a coil. A bias voltage $V_C$ to control the diode 13 is applied across the terminals 16. The inductor 15 isolates the dc bias from the RF signals.

When sufficiently large voltages are applied to the diode, the diode simply switches the capacitor 14 in and out of the circuit. This results in a change of the resonant frequency of the HTS self-resonant transmit and receive coil 11, but provides no damping unless an additional component, i.e., a resistor, is provided in the Q-damping circuit. The Q-damping circuit of the instant invention, and its method of operation, does not require an additional resistor. The Q-damping circuit of the instant invention results in a recovery time of the HTS self-resonant transmit, receive, or transmit and receive coil that is sufficiently short to enable the detection of the NQR signals when the diode is operated at a forward bias such that the diode resistance is from about 10 to about 1000 ohms. The inductor serves to isolate the DC bias from the RF signals.

The planar or surface coil preferred for use as the high temperature superconductor self-resonant transmit, receive or transmit and receive, coil has a HTS coil configuration on only one side of the substrate, or has essentially identical HTS coil configurations on both sides of the substrate.

It is often advantageous to be able to fine tune the resonance frequency. One means for accomplishing such tuning is to use two coupled high temperature superconductor self-resonant coils. The resonance frequency of the fundamental symmetric mode of the two coupled high temperature superconductor self-resonant coils can be varied by mechanically displacing one coil with respect to the other, and these coupled coils serve as the HTS transmit, receive or transmit and receive, coil.

Preferably, the single loop in the Q-damping circuit is a single loop of copper or HTS on the same substrate as the HTS transmit, receive, or transmit and receive, coil.

The use of a HTS self-resonant planar transmit, receive, or transmit and receive, coil provides several advantages over the conventionally used copper coil. These advantages arise from the high Q of the HTS self-resonant coil, which has Q's on the order of $10^3$-$10^6$ compared to the typical Q of $10^2$ for a copper system. The large Q of the HTS self-resonant coil produces large magnetic field strengths during the RF transmit pulse and does so at lower RF power levels. This dramatically reduces the amount of transmitted power required to produce NQR signals for detection, and thereby reduces the size of the RF power supply sufficiently so that it can be run on portable batteries.

The large Q of the HTS self-resonant coil also plays an important role during the receive time. As the signal-to-noise (S/N) ratio is proportional to the square root of Q, the use of the HTS self-resonant coil results in an increase in S/N by a factor of 10-100 over that of the copper system. These advantages during both the transmit and the receive times enable a detector configuration that is small and portable. It is therefore important to be able to introduce Q-damping to enable the use of such a coil.

High temperature superconductors are those that superconduct above 77K. The high temperature superconductors used to form the HTS self-resonant coil and the single loop or coil in the Q-damping circuit are preferably selected from the group consisting of $YBa_2Cu_3O_7$, $Tl_2Ba_2CaCu_2O_8$, $TlBa_2Ca_2Cu_3O_9$, $(TlPb)Sr_2CaCu_2O_7$ and $(TlPb)Sr_2Ca_2Cu_3O_9$. Most preferably, the high temperature superconductor is $YBa_2Cu_3O_7$ or $Tl_2Ba_2CaCu_2O_8$.

Provision must be made for a power supply to supply power for transmitting the RF pulse as well as for related circuitry for processing the detected NQR signal. Provision must also be made for cooling the HTS coil to liquid nitrogen temperature.

The advantageous effects of this invention are demonstrated by a series of examples, as described below. The embodiments of the invention on which the examples are based are illustrative only, and do not limit the scope of the appended claims.

EXAMPLE 1

The purpose of this example is to demonstrate the rapid recovery time achieved with the Q-damping circuit and the diode operated at a forward bias such that the diode is resistive. The Q-damping circuit used is shown in FIG. 2. The HTS self-resonant transmit and receive coil used is comprised of two coupled essentially identical $Tl_2Ba_2CaCu_2O_8$ planar coils. Each of the coupled coils is on a sapphire ($Al_2O_3$) substrate with the coil design configuration shown in FIG. 3 on both sides of the substrate.

A clean, polished single crystal sapphire substrate with a diameter of 2 inches (5.1 cm) and an approximate thickness of 0.018 inches (0.46 mm) was obtained from Union Carbide Corp. An epitaxial $CeO_2$ buffer layer is grown on both sides of the substrate by off-axis sputter deposition with the substrate temperature held in the range of about 700-800° C. Off-axis magnetron sputtering of a Ba:Ca:Cu oxide target is used to deposit, at room temperature (about 20° C.), an amorphous precursor Ba:Ca:Cu oxide film on the $CeO_2$ buffer layer on both sides of the substrate. This amorphous Ba:Ca:Cu oxide film is about 550 nm thick and had a stoichiometry of about 2:1:2. The precursor film is then thallinated by annealing it in air for about 45 minutes at 850° C. in the presence of a powder mixture of $Tl_2Ba_2Ca_2Cu_3O_{10}$ and $Tl_2O_3$. When this powder mixture is heated, $Tl_2O$ evolves from the powder mixture, diffuses to the precursor film and reacts with it to form the $Tl_2Ba_2CaCu_2O_8$ phase.

Figure 3:
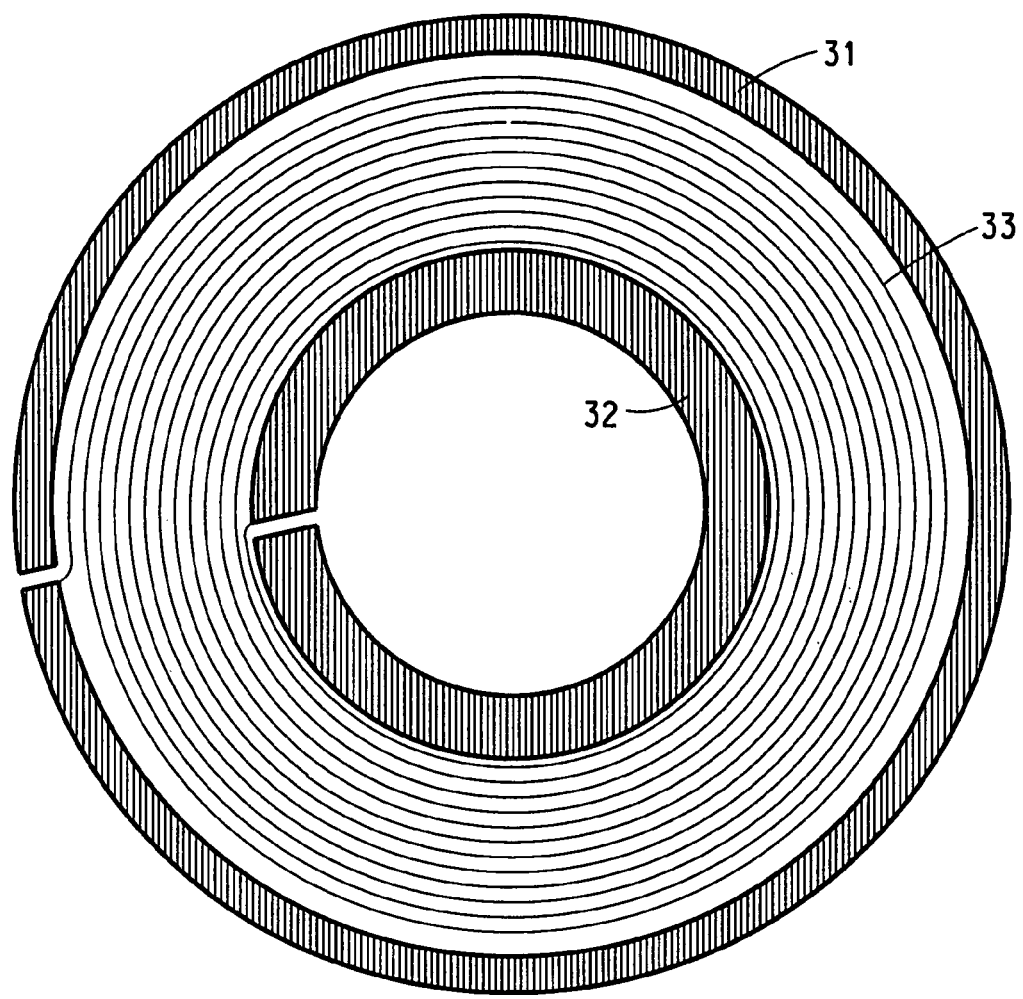
FIG. 3 shows the HTS coil design of the HTS transmit and receive coil used in Examples 1 and 2.

The sample is then coated with photoresist on both sides and baked. A coil design mask with the design shown in FIG. 3 is prepared. The coil has an inner radius of about 10.5 mm and an outer radius of about 22.5 mm. The outermost HTS ring 31 of the coil is about 2 mm wide, and the innermost HTS ring 32 is about 3.5 mm wide. The intermediate HTS rings 33 are about 250 µm wide with about 250 µm gaps between the rings.

The coil design mask is then centered on the photoresist covering the $Tl_2Ba_2CaCu_2O_8$ film on the front side of the substrate and exposed to ultraviolet light. The coil design mask is then centered on the photoresist covering the $Tl_2Ba_2CaCu_2O_8$ film on the back side of the substrate and exposed to ultraviolet light. The resist is then developed on both sides of the substrate, and the portion of the $Tl_2Ba_2CaCu_2O_8$ film exposed when the resist is developed is etched away by argon beam etching. The remaining photoresist layer is then removed by an oxygen plasma.

The result is a coil structure comprised of the single crystal sapphire substrate with a $CeO_2$ buffer layer, and a high temperature superconductor $Tl_2Ba_2CaCu_2O_8$ pattern of the configuration shown in FIG. 3 centered on the $CeO_2$ buffer layer on each side of the single crystal sapphire substrate. The process is repeated in essentially the same way to produce a second coil essentially identical to the first.

Figure 4A:
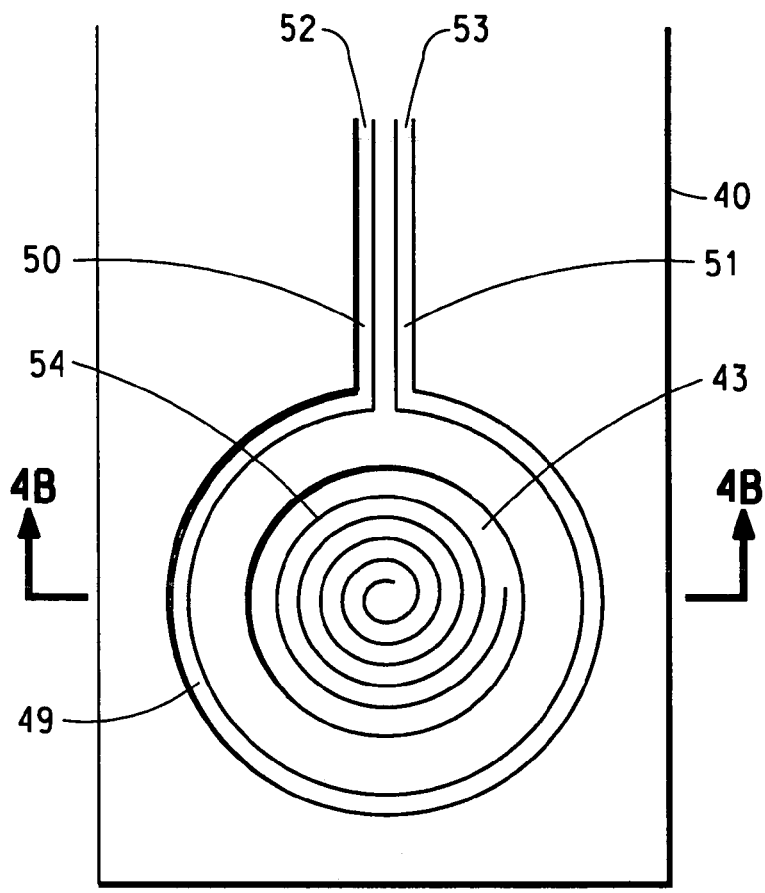
FIGS. 4A and 4B show the holder that is used in Examples 1 and 2 to hold the sapphire substrate with the HTS coil and the single loop that inductively couples the Q-damping circuit to the HTS coil.
Figure 4B:
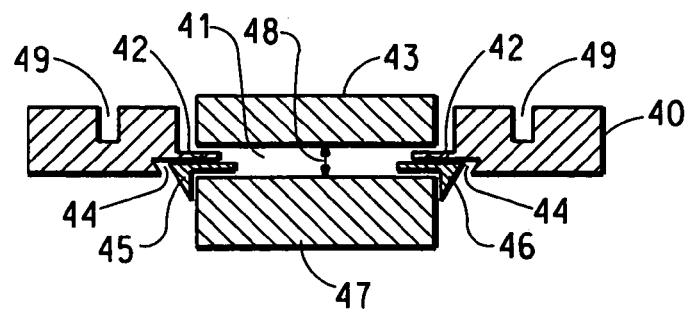

FIG. 4A is a schematic drawing of the top view of holder 40 that holds the two sapphire substrates and the copper single loop. FIG. 4B is a cross section of the holder 40 taken at points "4B"–"4B" of FIG. 4A. The holder 40 is a fiberglass epoxy laminate. A circular hole 41 of radius about ⅞ inch (2.2 cm) is cut near one end of the sample holder 40. A second hole with an outer radius of about 1 inch (2.5 cm) is cut leaving a ledge 42 to hold the one sapphire substrate 43 as shown. On the opposite side of ledge 42, a cut-out 44 is made to accommodate moveable substrate holders 45 and 46 that serve to hold the other sapphire substrate 47. The two moveable substrate holders 45 and 46 also serve to translate sapphire substrate 47 laterally, i.e. horizontally, with respect to sapphire substrate 43, and thereby enable the resonance frequency of the two coupled HTS coils to be fine tuned. The distance 48 between the two sapphire substrates is 1 mm.

A circular groove 49 of radius about 1.1 inch (2.8 cm) surrounding and concentric with the sapphire substrate 43 is cut into the surface of the sample holder 40 along with parallel grooves 50 and 51. A piece of 18 American Wire Gauge copper wire, not shown, is placed in parallel groove 50 beginning at point 52 and extending along groove 50 to the circular groove 49, around circular groove 49 to parallel groove 51, and along groove 51 to point 53. The copper wire in the circular groove 49 serves as a single loop to inductively couple the HTS transmit and receive coil to the Q-damping circuit. Connections to the other components of the Q-damping circuit shown in FIG. 2 are made at points 52 and 53. The HTS pattern 54 on one side of the sapphire substrate 43 is indicted in FIG. 4A. The capacitor 14 of the Q-damping circuit shown in FIG. 2 had a capacitance of 820 pF and the inductor 15 an inductance of 75 µH. The diode 13 is a 1N4150 diode obtained from Vishay Semiconductor GmbH, Heilbronn, Germany. The resistance of the 1N4150 diode as a function of forward bias voltage is shown in the table below.

| Forward Voltage (V) | Resistance (Ω) |
|---|---|
| 0.5 | 5000 |
| 0.6 | 600 |
| 0.9 | 9 |
| 1.6 | 1.6 |

The HTS self-resonant transmit and receive coil is immersed in liquid nitrogen held in a Nalgene® dewar. A pick-up coil comprised of a loop of copper wire is placed about 1 inch (2.5 cm) away from the coil with the plane of the pick-up coil parallel to the plane of the coil. The pick-up coil is formed by removing the outer jacket and dielectric spacer from a piece of 0.080 inch (2 mm) coax cable. The loop is formed by bending the inner conductor into a circle, and soldering it to the outer jacket of the coax cable just outside the point where the jacket and dielectric are removed. The pick-up coil is connected to an Agilent 8753 Vector Network Analyzer (Agilent Technologies, Palo Alto, Calif.). The frequency is swept and the resonance frequency and Q measured.

When the bias voltage $V_C$ is set at +8 V, a reverse bias for the diode, the Q-damping circuit is not active, and the sapphire substrate 47 is translated with respect to sapphire substrate 43 such that the resonance frequency is 3.757 MHz. The Q=5,100. When the bias voltage is set at −0.63 V, a forward bias for the diode, the Q-damping circuit is active, the resonance frequency is 3.746 MHz, and the Q=150.

The recovery time of the HTS self-resonant transmit and receive coil is measured as follows. A 50 µs 100 W RF pulse is applied to the HTS self-resonant transmit and receive coil. The Q-damping circuit is immediately activated by applying a $V_C$ of −0.63 V, a forward bias for the diode. The root-mean-square (RMS) amplitude of the RF signal is measured as a function of time. The results are shown in the table below. The time is measured from the end of the 50 µs pulse. The RMS amplitude of the noise level is 2 mV.

| Time (µs) | RMS Amplitude (mV) |
|---|---|
| 10 | 86 |
| 20 | 29 |
| 30 | 12 |
| 40 | 2 |
| 50 | 2 |
| 100 | 2 |

These results show that the HTS self-resonant transmit and receive coil is fully damped in 40 µs when the diode is operated with a forward bias such that the diode is resistive with a resistance near 600 ohms.

EXAMPLE 2

The purpose of this example is to demonstrate the detection of NQR signals from sodium nitrate using the Q-damping circuit of the instant invention. The same HTS self-resonant transmit and receive coil, comprised of the same two coupled essentially identical $Tl_2Ba_2CaCu_2O_8$ planar coils and the copper single loop coupling the HTS self-resonant transmit and receive coil to the Q-damping circuit, used in Example 1 is used in Example 2. The Q-damping circuit is identical to that used in Example 1 except that the inductor 15 had inductance of 3300 µH. In addition, a 0.1 µH ceramic capacitor is added to the circuit between the bias voltage $V_C$ electrode attached to the inductor 15 and ground for additional noise suppression.

The sodium nitrate sample is placed approximately 1 cm from the HTS self-resonant transmit and receive coil. A bias voltage $V_C$ is set at +8 V, a reverse bias for the diode, to inactivate the Q-damping circuit, and a bias voltage is set at −0.6 V, a forward bias for the diode, to activate the Q-damping circuit.

As shown below in Sequence 1 of the sequence of timed steps, a 100 µs 100 W RF pulse is applied to the HTS self-resonant transmit and receive coil. There is then a 2500 µs waiting period during which the Q-damping circuit is inactive followed by the transmission of a 200 µs 100 W RF pulse. The Q-damping circuit is immediately turned on for 250 µs. This is followed by a 300 µs waiting period. There is then a 8000 µs receive step. The receiver circuit is comprised of a Miteq AU1464LNA preamplifier (Miteq, Hauppage, N.Y. 11788), a Minicircuits ZYSWA-2-50DR RF Gate (Minicircuits, Brooklyn, N.Y. 11235-0003), a Minicircuits ZP10514 RF mixer, and a baseband amplifier and lowpass filter module. The receiver is turned "off" and "on"

using the RF GATE, and is turned "on" after the 300 µs waiting period and left "on" for 8000 µs.

| Sequence | Duration (µs) | Description |
|---|---|---|
| 1 | 100 | Transmit - 100 W |
| 2 | 2500 | Q-damping inactive |
| 3 | 200 | Transmit - 100 W |
| 4 | 250 | Q-damping active |
| 5 | 300 | Waiting Period |
| 6 | 8000 | Receive Mode |

With this sequence of steps, a 200 mV peak-to-peak NQR sodium nitrate signal is detected during sequence step 6. The experiment is repeated as described above except that the Q-damping circuit is also turned on during the 2500 µs of sequence step 2, and a 250 mV peak-to-peak NQR sodium nitrate signal is then detected during sequence step 6. The noise level is measured when there is no transmit signal and found to be a maximum of about 100 mV peak-to-peak.

These results demonstrate the use of the detection of NQR signals from sodium nitrate using the Q-damping circuit of the instant invention, i.e. wherein the Q-damping circuit contains a diode operated with a forward bias such that the diode is resistive with a resistance of about 600 ohms.

Where an apparatus of this invention is stated or described as comprising, including, containing, having, being composed of or being constituted by certain components, it is to be understood, unless the statement or description explicitly provides to the contrary, that one or more components other than those explicitly stated or described may be present in the apparatus. In an alternative embodiment, however, the apparatus of this invention may be stated or described as consisting essentially of certain components, in which embodiment components that would materially alter the principle of operation or the distinguishing characteristics of the apparatus would not be present therein. In a further alternative embodiment, the apparatus of this invention may be stated or described as consisting of certain components, in which embodiment components other than those as stated would not be present therein.

Where the indefinite article "a" or "an" is used with respect to a statement or description of the presence of a component in an apparatus of this invention, it is to be understood, unless the statement or description explicitly provides to the contrary, that the use of such indefinite article does not limit the presence of the component in the apparatus to one in number.

What is claimed is:

1. A nuclear quadrupole resonance detection system, comprising a high temperature superconductor self-resonant transmit and receive coil and a Q-damping circuit for the transmit and receive coil, wherein the Q-damping circuit comprises a diode operated with a forward bias such that the diode has a resistance of about 10 to about 1000 ohms and is able to provide all needed Q-damping circuit resistance.

2. The nuclear quadrupole resonance detection system of claim 1, wherein the resistance is from about 100 to about 800 ohms.

3. The nuclear quadrupole resonance detection system of claim 2, wherein the resistance is from about 500 to about 650 ohms.

4. The nuclear quadrupole resonance detection system of any of claims 1-3, further comprising a single loop or coil to inductively couple the Q-damping circuit to the high temperature superconductor self-resonant transmit and receive coil.

5. The nuclear quadrupole resonance detection system of claim 4, wherein the single loop or coil comprises a high temperature superconductor.

6. The nuclear quadrupole resonance detection system of claim 4, wherein the single loop or coil is copper.

7. The nuclear quadrupole resonance detection system of any of claims 1-3, further comprising a high temperature superconductor single loop to inductively couple the Q-damping circuit to the high temperature superconductor self-resonant transmit and receive coil.

8. The nuclear quadrupole resonance detection system of any of claims 1-3, further comprising a copper single loop to inductively couple the Q-damping circuit to the high temperature superconductor self-resonant transmit and receive coil.

9. The nuclear quadrupole resonance detection system of any of claims 1-3, wherein the Q-damping circuit further comprises a capacitor and an inductor.

10. A nuclear quadrupole resonance detection system, comprising a high temperature superconductor self-resonant transmit coil and a Q-damping circuit tot the transmit coil, wherein the Q-damping circuit comprises a diode operated with a forward bias such that the diode has a resistance of about 10 to about 1000 ohms and is able to provide all needed Q-damping in circuit resistance.

11. The nuclear quadrupole resonance detection system of claim 10, wherein the resistance is from about 100 to about 800 ohms.

12. The nuclear quadrupole resonance detection system of claim 11, wherein the resistance is from about 500 ohms to about 650 ohms.

13. The nuclear quadrupole resonance detection system of any of claims 10-12, further comprising a single loop, or coil to inductively couple the Q-damping circuit to the high temperature superconductor self-resonant transmit coil.

14. The nuclear quadrupole resonance detection system of claim 13, wherein the single loop or coil comprises a high temperature superconductor.

15. The nuclear quadrupole resonance detection system of claim 13, wherein the single loop or coil is copper.

16. The nuclear quadrupole resonance detection system of any of claims 10-12, further comprising a high temperature superconductor single loop to inductively couple the Q-damping circuit to the high temperature superconductor self-resonant transmit coil.

17. The nuclear quadrupole resonance detection system of any of claims 10-12, further comprising a copper single loop to inductively couple the Q-damping circuit to the high temperature superconductor self-resonant transmit coil.

18. The nuclear quadrupole resonance detection system of any of claims 10-12, wherein the Q-damping circuit further comprises a capacitor and an inductor.

19. A nuclear quadrupole resonance detection system, comprising a high temperature superconductor self-resonant receive coil and a Q-damping circuit for the receive coil, wherein the Q-damping circuit comprises a diode operated with a forward bias such that the diode has a resistance of about 10 to about 1000 ohms and is able to provide all needed Q-damping circuit resistance.

20. The nuclear quadrupole resonance detection system of claim 19, wherein the resistance is from about 100 to about 800 ohms.

21. The nuclear quadrupole resonance detection system of claim 20, wherein the resistance is from about 500 ohms to about 650 ohms.

22. The nuclear quadrupole resonance detection system of any of claims 19-21, further comprising a single loop or coil to inductively couple the Q-damping circuit to the high temperature superconductor self-resonant receive coil.

23. The nuclear quadrupole resonance detection system of claim 22, wherein the single loop or coil comprises a high temperature superconductor.

24. The nuclear quadrupole resonance detection system of claim 22, wherein the single loop or coil is copper.

25. The nuclear quadrupole resonance detection system of any of claims 19-21, further comprising a high temperature superconductor single loop to inductively couple the Q-damping circuit to the high temperature superconductor self-resonant receive coil.

26. The nuclear quadrupole resonance detection system of any of claims 19-21, further comprising a copper single loop to inductively couple the Q-damping circuit to the high temperature superconductor self-resonant receive coil.

27. The nuclear quadrupole resonance detection system of any of claims 19-21, wherein the Q-damping circuit further comprises a capacitor and an inductor.

28. The nuclear quadrupole resonance detection system of any of claims 3, 12 and 21, wherein the resistance is about 600 ohms.

* * * * *